(12) United States Patent
Vetesnik (10) Patent No.: US 8,925,679 B2
(45) Date of Patent: Jan. 6, 2015

(54) APPARATUS FOR RECEIVING SHOCK LOADING

(75) Inventor: Jan Vetesnik, Winnipeg (CA)

(73) Assignee: Tuffbuilt Products Inc., Wpg, MB (CA)

( * ) Notice: Subject to any disclaimer, the term of this patent is extended or adjusted under 35 U.S.C. 154(b) by 119 days.

(21) Appl. No.: 13/355,995

(22) Filed: Jan. 23, 2012

(65) Prior Publication Data

US 2012/0193165 A1 Aug. 2, 2012

Related U.S. Application Data

(60) Provisional application No. 61/437,426, filed on Jan. 28, 2011.

(51) Int. Cl.
| | |
|---|---|
| A47L 3/04 | (2006.01) |
| A62B 1/16 | (2006.01) |
| A62B 35/00 | (2006.01) |
| A63B 29/02 | (2006.01) |
| E06C 7/18 | (2006.01) |
| A62B 35/04 | (2006.01) |
| F16F 7/12 | (2006.01) |

(52) U.S. Cl.
CPC .............. *A62B 35/04* (2013.01); *A62B 35/0068* (2013.01); *F16F 7/125* (2013.01)
USPC ............................................. 182/3; 188/376

(58) Field of Classification Search
USPC ............. 182/3, 36, 71, 233; 267/136, 140.11; 188/371, 376
See application file for complete search history.

(56) References Cited

U.S. PATENT DOCUMENTS

| 4,531,619 | A * | 7/1985 | Eckels ........................... 188/371 |
| 4,589,523 | A * | 5/1986 | Olson et al. .................... 182/234 |
| 6,338,399 | B1 * | 1/2002 | Choate ........................... 188/374 |
| 6,401,863 | B1 * | 6/2002 | Kirkland ....................... 182/142 |
| 6,446,936 | B1 * | 9/2002 | Ostrobrod ..................... 254/368 |
| 6,533,066 | B1 * | 3/2003 | O'Dell ............................... 182/3 |
| 6,581,725 | B2 * | 6/2003 | Choate .............................. 182/3 |
| 6,592,101 | B2 * | 7/2003 | Vetesnik ....................... 254/285 |
| 6,918,464 | B2 * | 7/2005 | Renton et al. ................... 182/18 |
| 7,104,371 | B2 * | 9/2006 | Renton .......................... 188/371 |
| 7,213,715 | B2 * | 5/2007 | Boily ............................ 212/179 |
| 7,363,875 | B2 * | 4/2008 | Vetesnik ....................... 116/212 |
| 7,461,727 | B2 * | 12/2008 | Renton .......................... 188/371 |
| 7,537,085 | B2 * | 5/2009 | Vetesnik ........................... 182/3 |
| 7,744,063 | B2 * | 6/2010 | Jones ............................. 254/392 |
| 7,828,116 | B2 * | 11/2010 | Vetesnik ......................... 182/18 |
| 7,918,493 | B2 * | 4/2011 | Nishiguchi et al. ...... 296/187.09 |

(Continued)

*Primary Examiner* — Katherine Mitchell
*Assistant Examiner* — Shiref Mekhaeil
(74) *Attorney, Agent, or Firm* — Adrian D. Battison; Ade & Company Inc.

(57) ABSTRACT

A fall restraint system includes a cable for attachment to a fall restraint harness assembly of a worker. The cable can be attached to a boom arm cantilevered on a mast carried from the ground or can be stretched between two points on opposed walls. A shock absorber is provided for absorbing at least part of the shock forces so as to reduce the loading applied to the support system. This comprises an elongate member with a movable member or sleeve mounted on it for longitudinal movement. The movement is resisted by a friction brake or a compressible material contained within a tube so that the sleeve moves along the tube in response to loads exceeding the normal load to reduce the loading on the cable while compressing the material in the tube.

17 Claims, 8 Drawing Sheets

(56) References Cited

U.S. PATENT DOCUMENTS

| | | | |
|---|---|---|---|
| 2004/0115390 A1* | 6/2004 | Hess et al. | 428/99 |
| 2004/0145098 A1* | 7/2004 | Thaler | 267/33 |
| 2005/0169735 A1* | 8/2005 | Pelsue | 414/469 |
| 2005/0284694 A1* | 12/2005 | Faye et al. | 182/3 |
| 2010/0032236 A1* | 2/2010 | Morris et al. | 182/112 |
| 2010/0109217 A1* | 5/2010 | Ruthinowski et al. | 267/140.13 |
| 2010/0126801 A1* | 5/2010 | Begin et al. | 182/3 |
| 2011/0198152 A1* | 8/2011 | Dowie | 182/3 |
| 2011/0226548 A1* | 9/2011 | Witlam et al. | 182/3 |
| 2012/0186906 A1* | 7/2012 | Chilton | 182/3 |
| 2012/0200099 A1* | 8/2012 | Nagwanshi et al. | 293/137 |

\* cited by examiner

APPARATUS FOR RECEIVING SHOCK LOADING

This application claims the benefit under 35 USC 119(e) of Provisional Application 61/437,426 filed Jan. 28, 2011.

This invention relates to an apparatus including a shock absorber for receiving shock loading.

BACKGROUND OF THE INVENTION

The present invention is particularly designed for use with a fall restrain harnesses for attachment to a worker in a situation where they may fall so that the shock loads from the fall can be transmitted through a structure to a suitable fixed support.

One problem with providing such devices is that of providing a suitable anchor at an elevated position so that the harness can be attached to save the worker from hitting the ground in a fall. The anchor point must be sufficiently elevated and sufficiently close to the worker to avoid a pendulum effect causing the falling worker to swing into contact with adjacent structures. The anchor point must accommodate the required high shock loading without damage, where the shock loading may significantly exceed any static loading. Thus the structure supporting the anchor point must have sufficient strength to meet the requirements for such high shock loading.

In situations where there is no suitable overhead structure, a ground or wall based system is required. In many cases there is little room or structure at the ground for the massive base required to provide the required loadings. A wall based system cannot apply high loadings to the walls without the danger of damage to the building structure.

However the above system particularly designed for fall restraint, can be used for supporting other loads in a situation where excess or shock loading above predetermined level can be expected.

SUMMARY OF THE INVENTION

It is one object of the invention to provide an apparatus for use in providing support where shock loads can occur which allows a reduction in forces applied to the supports in the event shock loading of a fall.

According to the invention there is provided an apparatus for receiving a shock load comprising:

a receiving member arranged for receiving the shock loads thereon;

a mounting element for supporting the receiving member where the shock load applied to the receiving member is transferred to the mounting member;

and a shock absorber for absorbing at least part of the shock forces so as to reduce the load applied to the mounting element, the shock absorber comprising:

a rigid elongate member;

a movable member mounted on the elongate member for movement along the elongate member from an initial operating position;

the receiving member being connected to the movable member such that the shock load applies a force to the movable member in a direction to cause said movement along the movable member;

and a resistance member operable between the elongate member and the movable member to control movement of the movable member;

the resistance member being arranged to hold the movable member against movement up to a predetermined maximum allowable force applied from the receiving member to the movable member;

the resistance member being arranged once the maximum allowable force is exceeded to allow controlled movement of the movable member to a retracted position;

the resistance member being arranged to provide substantially no resilience so that energy of the movement is absorbed rather than returned and the movable member is not returned by the resistance member from the retracted position to the initial operating position when the force is released;

the receiving member and the movable member being arranged, in the retracted position, to reduce a force applied from the receiving member to the mounting element relative to that which would be applied in the event that the movable member does not move.

The load receiving member is typically a cable for attachment to a harness for the fall restraint system with which the present invention is primarily concerned, since the cable can move to different positions with the movement of the user. However other load transfer members can be used including rigid elements.

Preferably the movement of the movable member continues at a constant rate for as long as an excess force greater than the maximum allowable force is applied. That is the controlled movement of the movable member to take up the excess load is controlled at a constant resistance to the movement, as provided by a compressible material of a predetermined density or by a friction brake which provides a constant resistant force. The movable member is not a spring and thus has no resilience to recoil the movable member back to the initial position. The energy from the excess force is absorbed into the movable member and not released back to the cable or force receiving member.

Preferably the cable and the movable member are arranged, in the retracted position, so that an angle of the cable to the elongate member is changed.

Preferably the cable and the movable member are arranged, in the retracted position, to change a mechanical advantage of the cable relative to the mounting element. This is obtained, in addition or instead to changing the angle by changing the location of the cable on the elongate member.

In some cases the resistance member can comprise a friction brake. This has the characteristics that it prevents any movement up to a predetermined value and then allows a constant resistance through a continued movement as long as the force exceeds the predetermined maximum.

In other cases the resistance member can comprise a compressible material which is compressed by the excess force. Such a compressible member is preferably plastically deformable so as to provide effectively no resilience.

Preferably the compressible member compresses longitudinally of the elongate member.

Preferably the elongate member comprises a tube on which the movable member slides where the tube contains the resistance member in an interior thereof. In this arrangement preferably there is provided a connecting member such as a cable between the resistance member in the interior of the tube and the movable member on the exterior of the tube.

For example the connecting member comprises a connecting cable connected at one end to the movable member and at the other end to the resistance member and arranged and guided such that movement of the resistance member allows the movable member to move along the elongate member.

Preferably the movable member is a sleeve surrounding the elongate member or tube for sliding movement along the tube.

Preferably the connecting cable extends longitudinally along the elongate member or tube and is guided over a pulley at one end of the tube so as to allow the movable member to slide along the tube away from the end of the tube.

In one arrangement the load receiving member comprises a cable which is engaged over a guide pulley mounted on the movable member and arranged that the force is applied to the pulley in a direction to cause the movable member to move along the elongate member to move the pulley with the movable member along the elongate member thus changing the position at which the load from the cable is applied to the tube.

In one arrangement the elongate member is cantilevered outwardly from a support so that the pulley is carried at a cantilever distance from the support such that the movement of the movable member with the pulley thereon acts to move the pulley toward the support to reduce the cantilever distance or mechanical advantage to reduce forces on the support. In this case, the cable can have an end connected at or adjacent the support and extends therefrom over the pulley such that the force pulls generally downwardly on the pulley.

Preferably the support is a mast carried on a base so that the reduction in the mechanical advantage reduces the forces on the base.

In another arrangement the cable is engaged over a guide pulley fixed to a support and extends from the pulley to the movable member with the elongate member extending longitudinally between the movable member and the pulley so that movement of the movable member along the elongate member caused by shock forces on the cable acts to pay out the cable over the pulley to reduce forces on the pulley from the cable. In this case, preferably, the cable extends generally horizontally from the pulley on the support to a second support.

In addition to receiving shock forces, the same mechanism can receive loads applied to the system in potential mis-use or overload situations and will provide a clear indication of the application of the overload to the system. That is, some unscrupulous persons may try to use the system for purposes for which is not intended leading to an overload on the Thus it will function essentially as a mechanical "fuse" that deforms to prevent damage to main structural components and indicate that the equipment has been overloaded.

The arrangement described herein also allows for the option of a friction brake design rather than just a compressible or deformable member.

The term "cable" used herein is not intended to be limited to any particular form of such an element and any structure of a suitable elongate element can be included formed of any materials such as fibers, rope, metal whether or not individual elements are twisted together.

The fall restraint harness assembly can be attached directly to the cable by a hook or other element or may be indirectly connect to the cable by intermediate members which transfer the loading to the cable.

Preferably the movable member is a sleeve surrounding the tube so that it slides on the tube. However the member may be mounted on the tube or other elongate member by other arrangement which allows it to move along the tube. This may include a track on the tube where the member is mounted on the track on one side of the tube.

Preferably the compressible member is plastically deformable so as to provide effectively no resilience. That is it is not a spring but instead it is intended to absorb the forces by movement and most importantly to allow the movement of the member to which the cable is attached.

For example the compressible member may be a plastically deformable coil but it can be a crushable material within the tube.

Preferably the compressible member compresses longitudinally of the tube against a fixed plug in the tube.

Preferably the connecting member comprises a connecting cable connected at one end to the movable member and at the other end to the compressible body and arranged and guided such that compression of the compressible body allows the movable member to move along the tube. Thus for example the connecting cable can extend longitudinally inside the tube and is guided over a pulley at one end of the tube so as to allow the coupling member to slide along the tube away from said one end of the tube. However other forms of connection member can be used such as simply a bar which connects the movable member or sleeve on the outside to the compressible material inside.

In one arrangement, this construction is used where the cable is engaged over a guide pulley on the movable member and arranged that the forces from the fall of the worker are applied to the pulley in a direction to cause the movable member to move along the tube to move the pulley with the movable member along the tube.

This is particularly helpful where the tube is cantilevered outwardly from a support so that the pulley is carried at a cantilever distance from the support such that the movement of the movable member with the pulley thereon acts to move the pulley toward the support to reduce the cantilever distance to reduce forces on the support. Where the support is a mast carried on a base, the reduction in the cantilever distance reduces the forces on the base. Preferably the tube itself forms a cantilever arm connecting the support to the pulley. However the tube may be mounted on a structural member which itself forms the arm. In this arrangement, the cable has an end connected at or adjacent the support and extends therefrom over the pulley to the restraint harness assembly such that forces from the restraint harness assembly pull generally downwardly on the pulley.

In an alternative arrangement, the cable is engaged over a guide pulley fixed to a support and extends from the pulley to the movable member with the tube extending longitudinally between the movable member and the pulley so that movement of the movable member along the tube caused by shock forces on the cable acts to pay out the cable over the pulley to reduce forces on the pulley from the cable. This is particularly useful where the cable extends generally horizontally from the pulley on the support to a second support for a hook of at least one restraint harness assembly to be attached thereto.

According to a further aspect of the invention there is provided an apparatus for use in fall restraint comprising:

a cable for attachment to a fall restraint harness assembly of a worker for receiving shock forces therefrom in the event of a fall by the worker;

and a shock absorber for absorbing at least part of the shock forces comprising:

an elongate member carrying a resistance body which can move against a resistance force;

a movable member mounted on the elongate member for movement along the elongate member;

a connecting member between the resistance body and the movable member such that movement of the movable member along the elongate member acts to compress the compressible body;

wherein the cable is engaged over a guide pulley on the movable member and arranged that the forces from the fall of the worker are applied to the pulley in a direction to cause the movable member to move along the elongate member to move the pulley with the movable member along the elongate member;

and wherein the elongate member is cantilevered outwardly from a support so that the pulley is carried at a cantilever distance from the support such that the movement of the movable member with the pulley thereon acts to move the pulley toward the support to reduce the cantilever distance to reduce forces on the support.

The arrangement described herein also allows for the option of a friction brake design rather than just a compressible or deformable member.

According to a yet further aspect of the invention there is provided an apparatus for use in fall restraint comprising:

a cable for attachment to a fall restraint harness assembly of a worker for receiving shock forces therefrom in the event of a fall by the worker;

and a shock absorber for absorbing at least part of the shock forces comprising:

an elongate member carrying a resistance body which can move against a resistance force;

a movable member mounted on the elongate member for movement along the elongate member;

a connecting member between the compressible body and the movable member such that movement of the movable member along the elongate member acts to compress the compressible body;

wherein the cable extends generally horizontally from a first support to a second support for a hook of at least one restraint harness assembly to be attached thereto.

and wherein the cable is engaged over a guide pulley fixed to the first support and extends from the pulley to the movable member with the tube extending longitudinally between the movable member and the pulley so that movement of the movable member along the tube caused by shock forces on the cable acts to pay out the cable over the guide pulley to reduce forces on the guide pulley from the cable.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
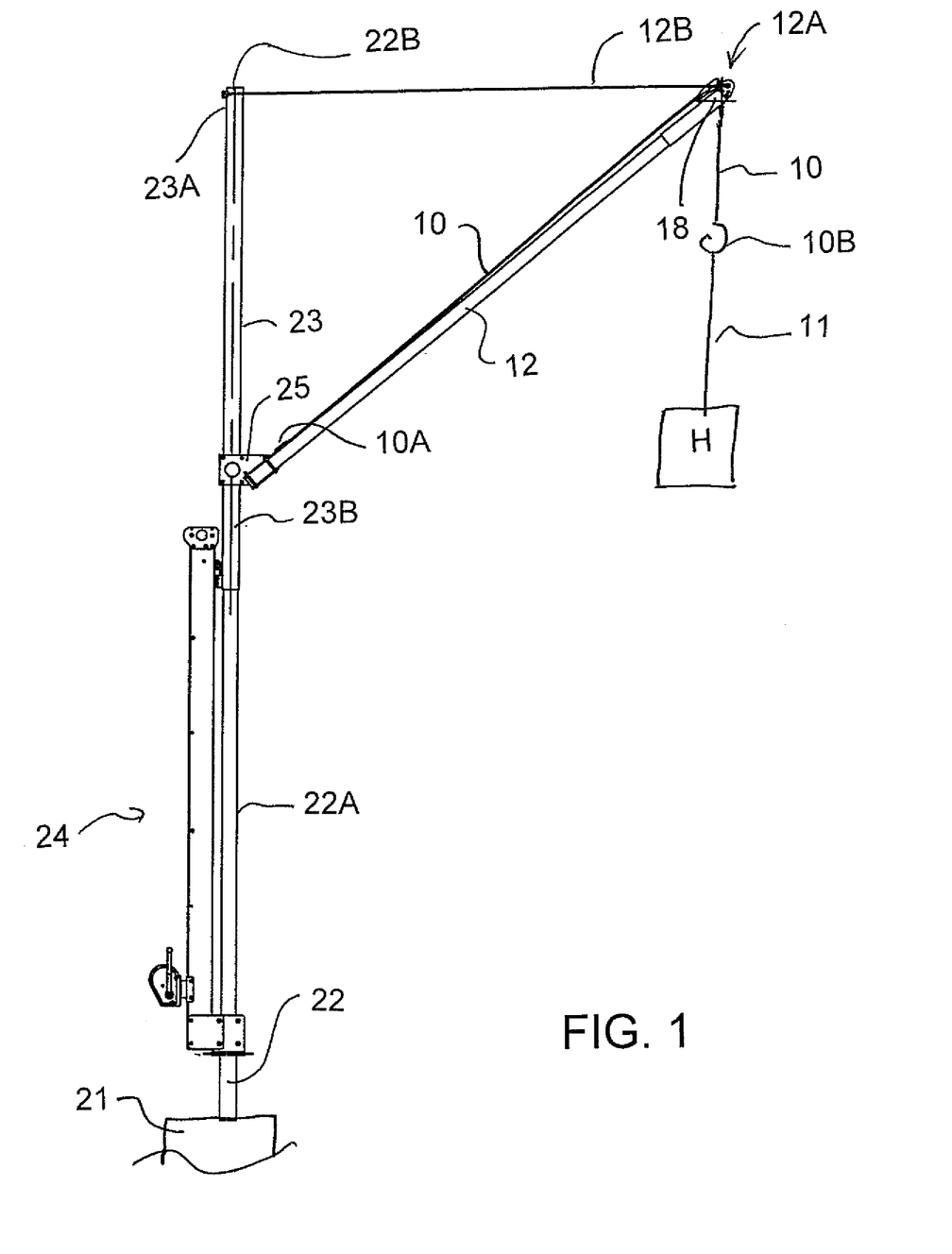
FIG. 1 is a side elevational view of a fall restraint support system for a harness on a worker including an apparatus for receiving a shock load according to the present invention.

As shown in FIG. 1, there is provided an apparatus for use in fall restraint which includes a cable 10 including an end portion 10A for attachment to a fall restraint harness assembly 11 of a worker. The harness 11 is of a conventional construction readily available and typically includes a cable with a system to pay out and reel in the cable and a spring to take up shock loads. However the anchor point for the harness must be designed to meet code requirements for shock loading bearing in mind that some workers may be particularly heavy and may fall a long distance before the arresting effect occurs. Thus the anchor point 10B defined by an end of the cable 10 is arranged for receiving shock forces from the harness 11 in the event of a fall by the worker.

In the arrangement of FIG. 1 there is provided a support for the cable 10 including a base 21 and a mast 22 standing upwardly from the base. Typically in this arrangement the base is arranged to be portable so that it must be sufficiently light weight to be liftable or movable on a cart or wheels. Thus loading on the base must be kept sufficiently low to avoid the base from toppling or breaking to allow collapse of the mast 22. In other cases the base my be permanently mounted but again the reduction in loading applied to the base allows the base to be constructed in a less massive manner than would otherwise be necessary.

The mast 22 forms a simple post and again the reduction in forces applied to the system from shock loads avoids the necessity for the post to be massive, allowing it to be designed to accommodate the static loads which can occur.

The mast includes an upper portion 22A which carries a slide tube 23 raise and lowered by a winch system 24. Thus the upper end 23A of the slide tube 23 can be moved to an uppermost end 22B of the mast. The slide tube 23 carries adjacent a lower end 23B a bracket 25 which attaches to the lower end 10A of the cable 10 and also attaches to a lower end of a boom 12 which carries at its upper end a fixed support 12A. The bracket 12A is connected to a tension cable 12B extending from the bracket to the top 23A of the slide tube. Thus the boom 10 is held at a fixed angle extending outwardly and upwardly from the slide tube 23 so that forces communicated from the cable 10 to the boom are transferred to the mast by compression forces in the boom and tension forces in the cable 12B. The height of the bracket 12A from the ground can be adjusted by the winch 24 so that the height of the harness support 10B can be adjusted to meet requirement of the harness relative to a workplace of the worker.

Figure 2:
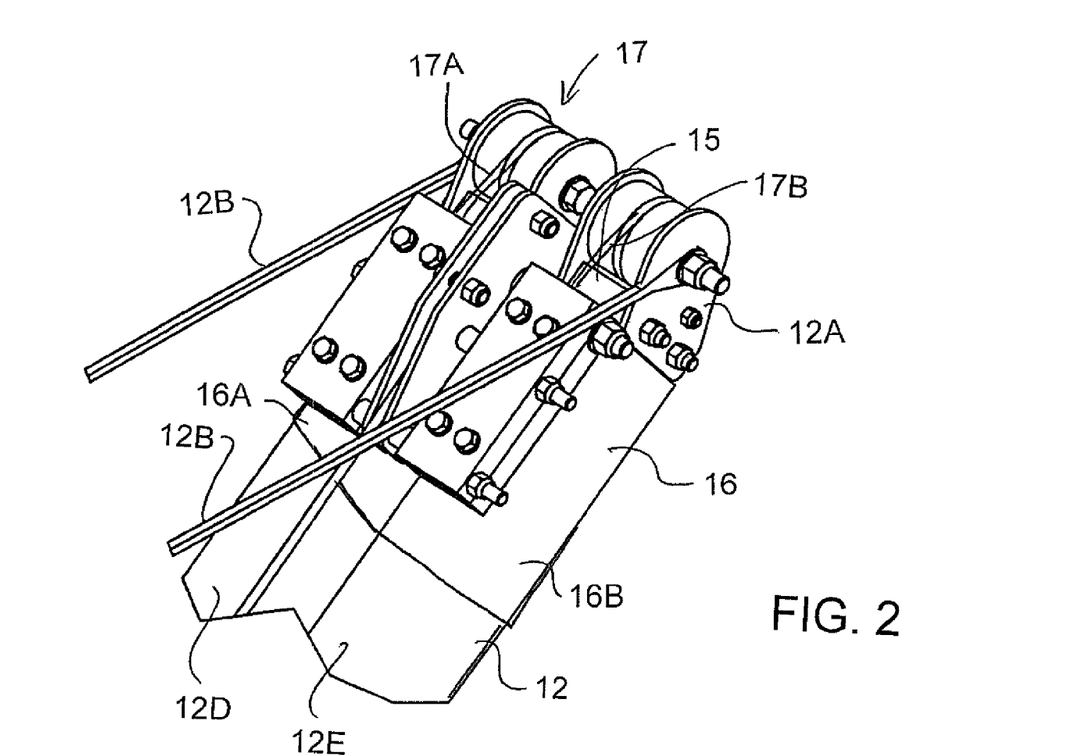
FIG. 2 is an isometric view of the upper end of the boom of the fall restraint support system of FIG. 1.
Figure 3:
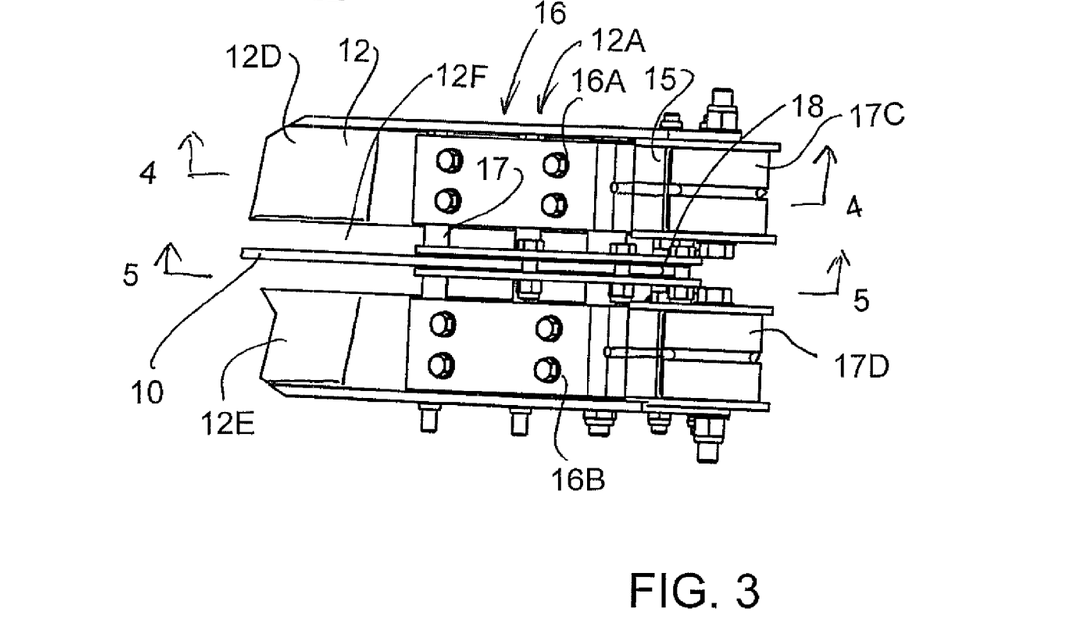
FIG. 3 is a top plan view of the upper end of the boom of the fall restraint support system of FIG. 1.
Figure 4:
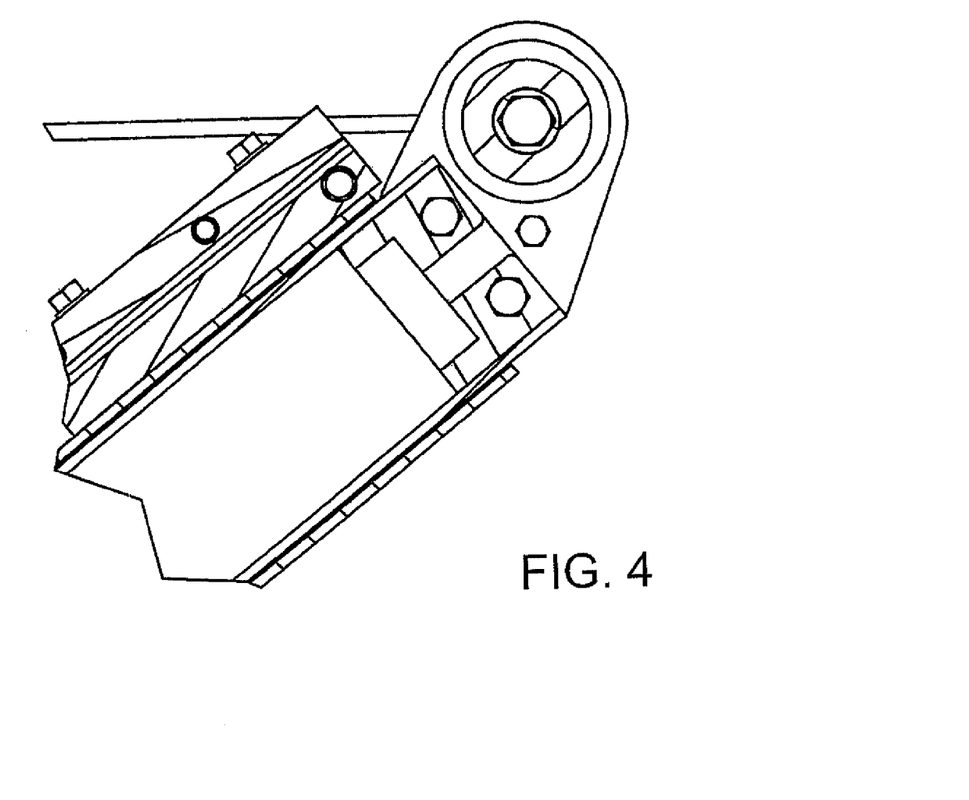
FIG. 4 is a cross-sectional view along the lines 4-4 of FIG. 3.
Figure 5:
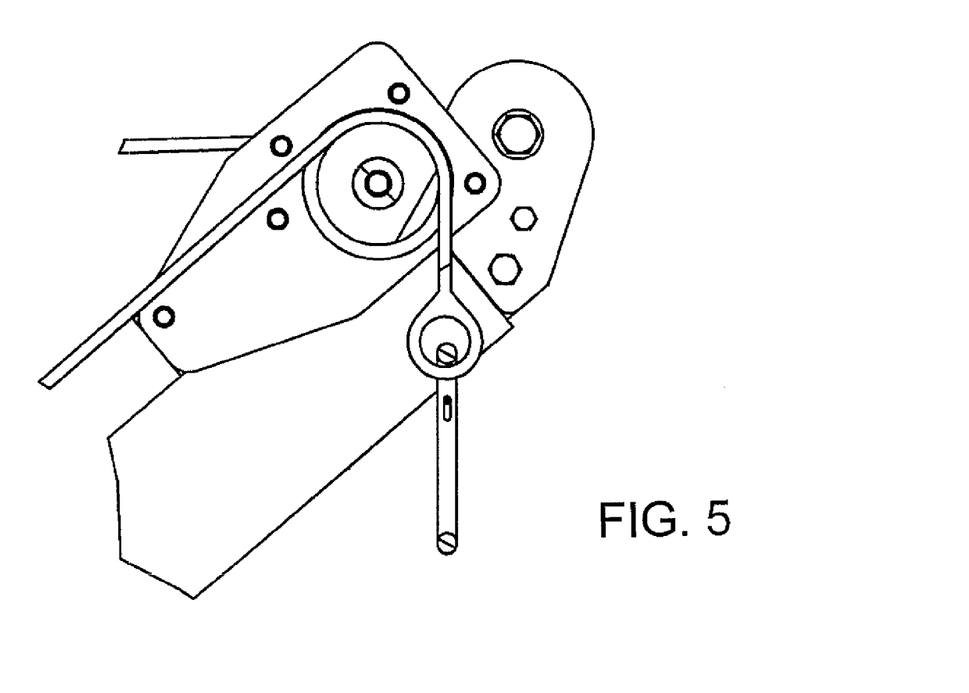
FIG. 5 is a cross-sectional view along the lines 5-5 of FIG. 3.

As the boom needs to accommodate twisting and bending forces, it is formed in the example shown as two parallel tubes 12D, 12E connected at the upper bracket 12A and the tube 23 so as to define a slot 12F between the tubes. Similarly the cable 12B is formed as two separate parallel cables each connected to an outer side face f the bracket 12A at the upper ends of the tubes 12D, 12E.

The cable 10 is connected to a shock absorber system 12C for absorbing at least part of the shock forces to avoid these being applied directly to the mast and base forming the support.

Figure 6:
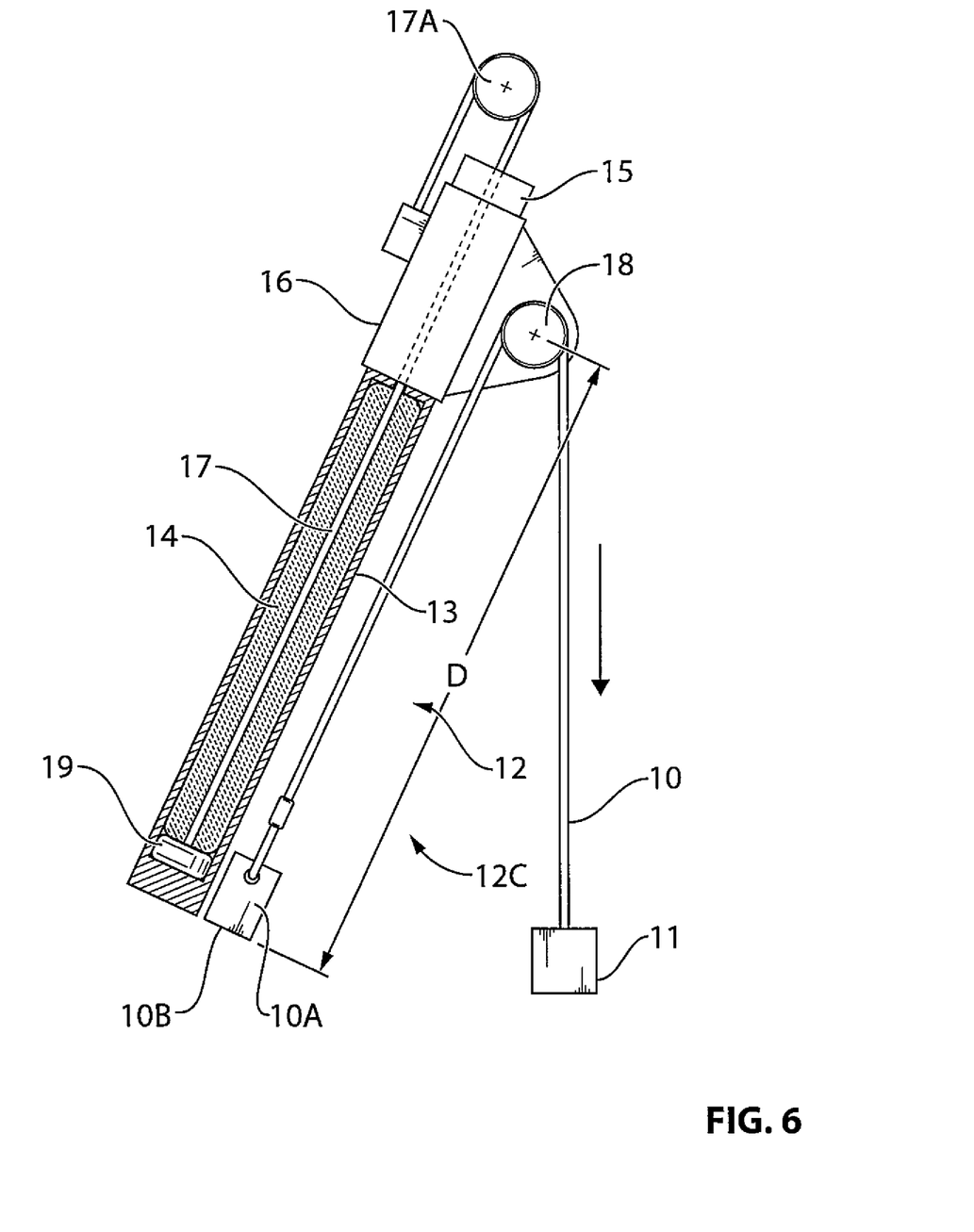
FIG. 6 is a vertical cross-sectional view of the boom of FIG. 1.

The system 12C comprises an enclosed longitudinally extending tube 13 containing an elongate compressible body 14 in the interior thereof. The compressible body 14 is a plastically deformable coil formed from a material which is not a spring but is formed of a plastically deformable material such as soft steel so as to provide effectively no resilience. Thus the compressible body 14 crushes or compresses longitudinally of the tube as a load is applied thereto greater than a predetermined engineered load. The compressible body 14 compresses against a fixed plug 15 at an upper end of the tube 13.

A movable member or sleeve 16 is mounted on an exterior of the boom 12 for sliding movement along the tube forming the boom. In the arrangement shown where the boom is formed of the two parallel tubes 12D, 12E, the sleeve 16 includes two separate sleeve portions 16A and 16B so as to be slidable on the respective tubes 12D, 12E. The sleeves 16A and 16B are connected by a connecting assembly 17 which provides a support for a pulley 18 mounted in the slot 12F.

Thus the cable 10 extends from the fixed lower end 10A at the bottom of the tube 23 over the pulley 18 at the movable member or sleeve 16 so that forces from the cable are transferred to downward forces on the pulley at the end of the boom and forces at the end 10A pulling along the boom. As the cable is under tension and the boom is inclined, the forces on the cable tend to pull the pulley 18 along the boom toward the mast. As the pulley is carried on the movable member or sleeve 16, this has forces applied thereto tending to pull the sleeve 16 along the boom tube 12.

The sleeve 16 is connected by a connecting cable system 17 including two cable portions 17A and 17B each extending between a plug 19 at the remote end of the compressible material 14 in the interior of the tube 12 which passes over a pulley 17C, 17D at the end plug 15 such that movement of the movable sleeve 16 along the exterior of the tube 12 acts to compress the compressible body by pulling the sliding plug 19 toward the fixed plug 15 at the upper end of the tube 13.

The cable 10 is connected to the movable sleeve 16 by passing over the pulley 19 such that shock forces on the cable 10 from the harness 11 above a predetermined maximum force are applied from the cable 10 to the pulley 18 on the movable sleeve in a direction causing sliding movement of the sleeve 16 along the tube 12 and therefore compression of the compressible body.

The compression acts to absorb shock forces but also allows the movement of the sleeve along the tube to as to carry the pulley 183 along the tube. As the material 14 is not a spring but is compressible, once the maximum allowable force is exceeded, the compression of that material continues at a constant rate proportional to the applied force for as long as the excess force is applied. Thus below the maximum force, no compression occurs and the pulley remains at its initial position. However a force above the maximum force acts to move the pulley 18 along the tube 12.

The tube 12 forms a structural member for supporting the pulley 18 to provide in effect an anchor point for the harness 11. This tube is cantilevered outwardly from the mast 22 carried on a base 21. Thus the pulley is carried at a cantilever distance D from the support mast 22 such that the movement of the sleeve 16 with the pulley 18 thereon acts to move the pulley 18 toward the mast 22 to reduce the cantilever distance D to a lesser distance. Thus a predetermined loading on the pulley 18 applies a predetermined force on the mast 22 at the distance D but this force on the mast is reduced at the moved position by the reduced mechanical advantage caused by the reduction in distance D to reduce forces on the mast 22 and the base 21.

Thus the apparatus for receiving the shock load from the harness includes the cable 10 acting as a receiving member arranged for receiving the shock loads thereon. The base and mast proved a mounting element 22 for supporting the cable 10 where the shock load applied to the cable 10 is transferred to the mounting member 22. A shock absorber system for absorbing at least part of the shock forces so as to reduce the load applied to the mounting element 22. The shock absorber includes the boom 12 forming a rigid elongate member and a sleeve 16 forming a movable member mounted on the elongate member 12 for movement along the elongate member 12 from an initial operating position at the upper end. The receiving member or cable 10 is connected to the movable member 16 such that the shock load applies a force to the movable member 16 in a direction to cause movement along the elongate member 12

A resistance member defined by the compression material 14 is operable between the elongate member 12 and the movable member 16 to control movement of the movable member. The resistance member 14 is arranged to hold the movable member 16 against movement up to a predetermined maximum allowable force applied from the receiving member 10 to the movable member 16. The resistance member 14 is arranged once the maximum allowable force is exceeded to allow controlled movement of the movable member 16 to a retracted position along the boom 12. The resistance member 14 is plastically deformable so as to provide substantially no resilience so that energy of the movement is absorbed rather than returned and the movable member is not returned by the resistance member from the retracted position to the initial operating position when the force is released. The receiving member cable 10 and the movable member 16 are arranged, in the retracted position, to reduce a force applied from the receiving member 10 to the mounting element support mast 22 relative to that which would be applied in the event that the movable member does not move and the sleeve 16 remains at the upper end.

The movement of the sleeve 16 to the middle of the boom increases bending loads on the boom so that the double tube construction is desirable.

Preferably the movement of the movable member continues at a constant rate for as long as an excess force greater than the maximum allowable force is applied. That is the controlled movement of the movable member to take up the excess load is controlled at a constant resistance to the movement, as provided by a compressible material of a predetermined density or by a friction brake which provides a constant resistant force. The movable member is not a spring and thus has no resilience to recoil the movable member back to the initial position. The energy from the excess force is absorbed into the movable member and not released back to the cable or force receiving member.

Thus as the sleeve 16 moves to the retracted position on the boom 12, the cable and the sleeve are arranged, in the retracted position, to change a mechanical advantage of the cable relative to the mast 22.

The resistance member comprises a compressible material 14 which is compressed by the excess force longitudinally of the boom. Such a compressible member is plastically deformable so as to provide effectively no resilience.

Figure 7:
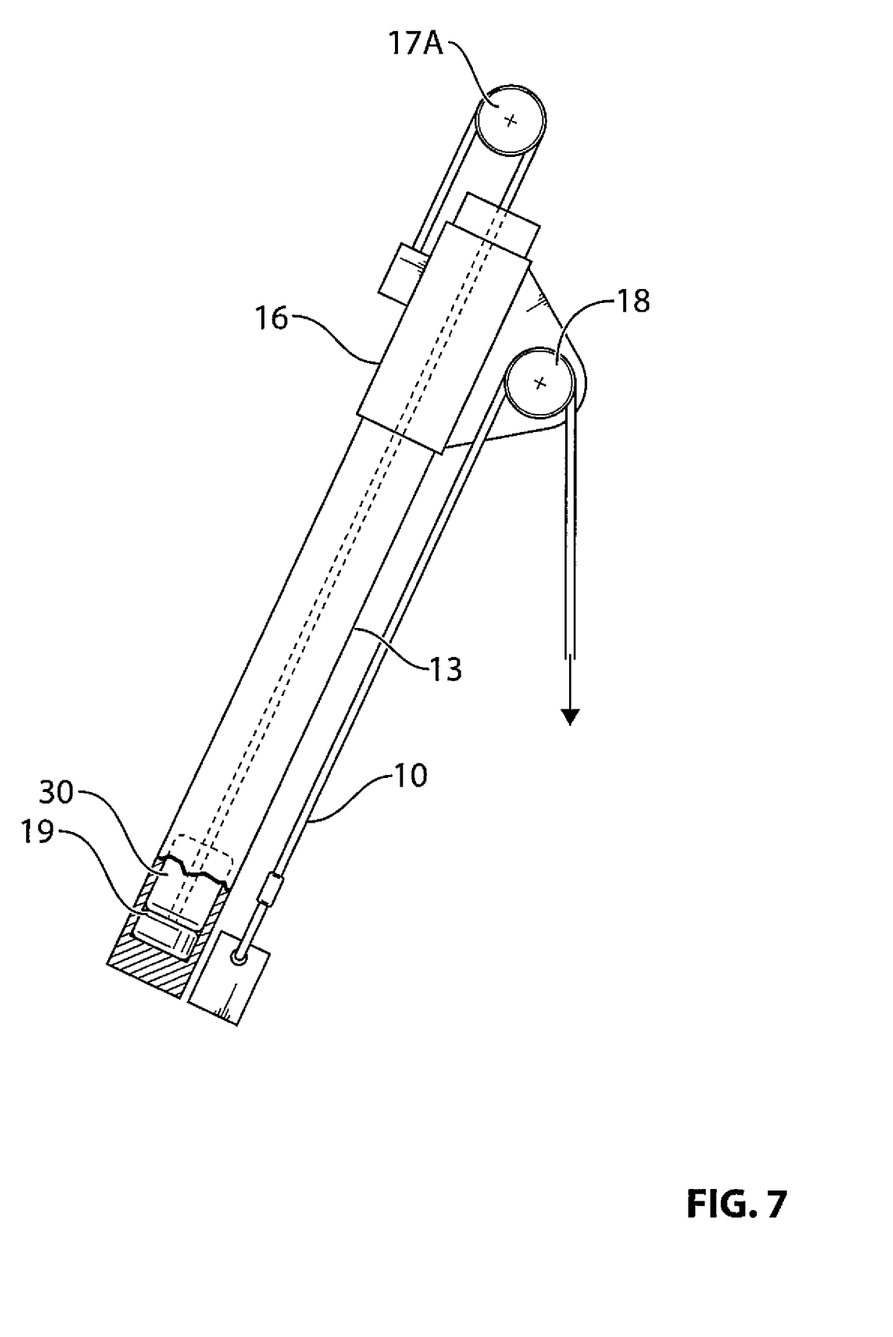
FIG. 7 is a vertical cross-sectional view of the boom of FIG. 1 showing a modified arrangement replacing the compressible material with a friction brake which allows the device to move provided the force applied exceeds the predetermined load.

In FIG. 7 an alternative arrangement is shown in which the compressible material 14 is replaced by a friction brake 30 acting between the plug 19 and the inside surface of the tube 13. This has the characteristics that it prevents any movement up to a predetermined value and then allows a constant resistance through a continued movement as long as the force exceeds the predetermined maximum.

Figure 8:
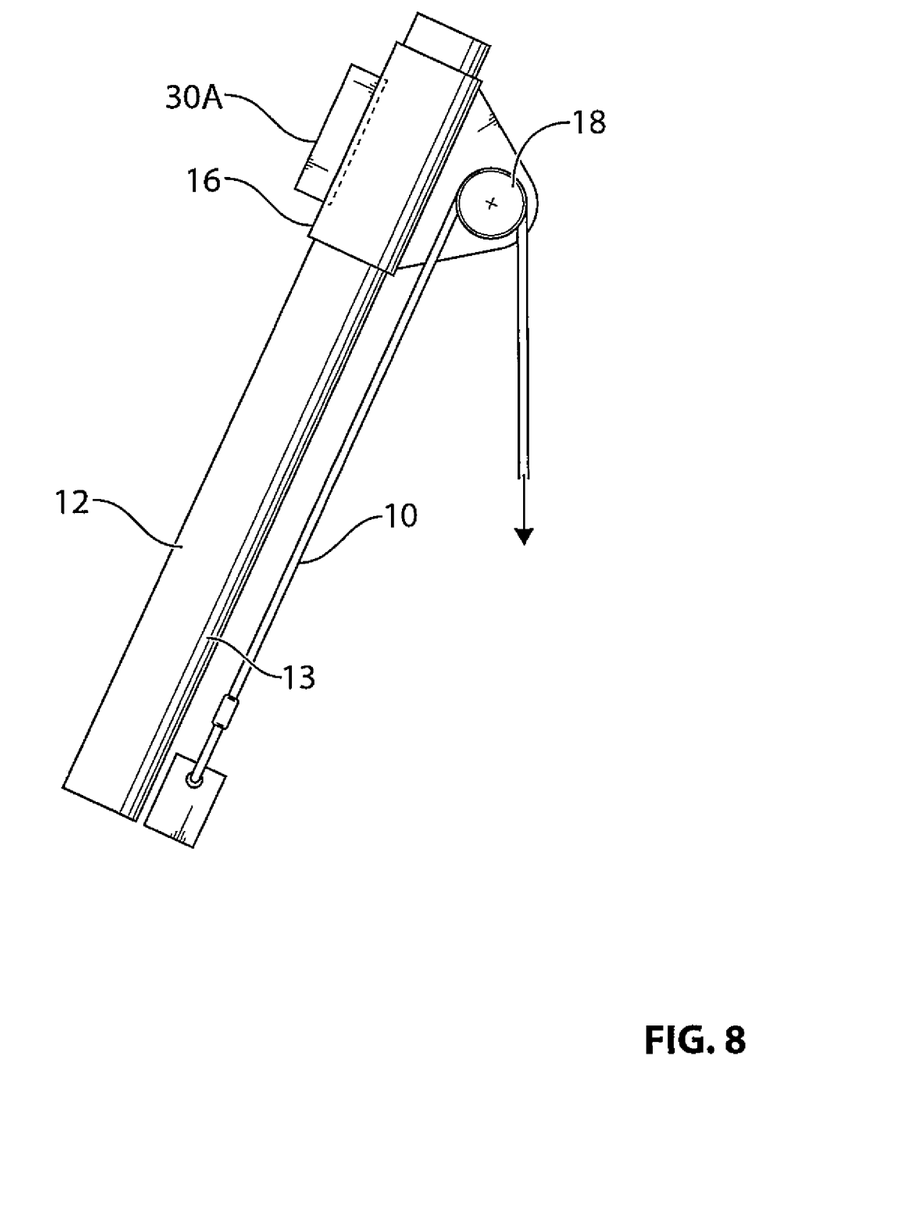
FIG. 8 is a side elevational view of the boom of FIG. 1 showing a further modified arrangement where the friction brake is applied to the movable member.

In FIG. 8 another alternative arrangement is shown in which the friction brake 30A is not provided between the plug and the tube but instead acts directly between the sleeve 16 and the exterior of the tube 13. Thus there is no need for the pulley 17A or the cable 17.

Figure 9:
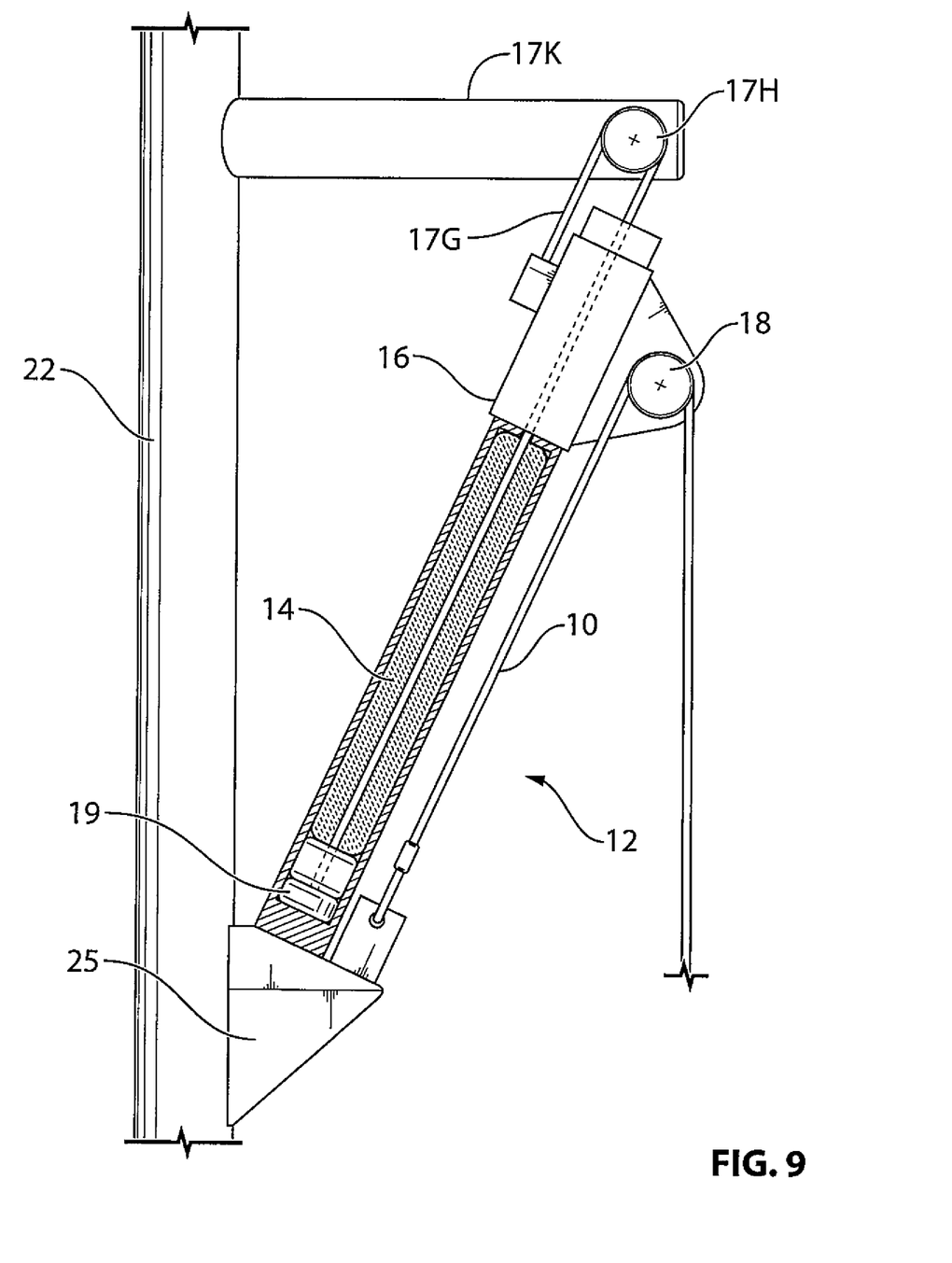
FIG. 9 is an alternative configuration of the boom and cable of FIG. 1 and using the shock absorbing device of FIG. 6.

In another arrangement shown in FIG. 9, the cable 17 is engaged over a guide pulley 17H fixed to a support 17K and extends from the pulley 17H to the movable member 16 with the boom 12 extending longitudinally between the movable member and the pulley so that movement of the movable member 16 along the elongate member 12 caused by shock forces on the cable 10 acts to pay out the cable 17C over the pulley 17H to reduce forces on the boom on the mast as the boom moves downwardly about its mounting bracket 25. In this case, preferably, the cable extends generally horizontally from the pulley on the support to a second support.

In this arrangement, the receiving member is the cable 10 and the mounting element includes the boom 17K and the mast 22. The shock absorber for absorbing at least part of the shock forces so as to reduce the load applied to the mounting element 22 includes the rigid elongate member 12 and the movable member defined by the plug 19 mounted on the elongate member 12 for movement along the elongate member 12 from an initial operating position shown in FIG. 9.

The receiving member 10 is connected such that the shock load from the cable 10 applies a force to the movable member 19 in a direction to cause said movement along the elongate member 12.

The compressible material 14 as previously described acts to control movement of the movable member, to hold the movable member against movement up to a predetermined maximum allowable force applied from the receiving member to the movable member, and, once the maximum allowable force is exceeded, to allow controlled movement of the movable member to a retracted position.

Figure 10:
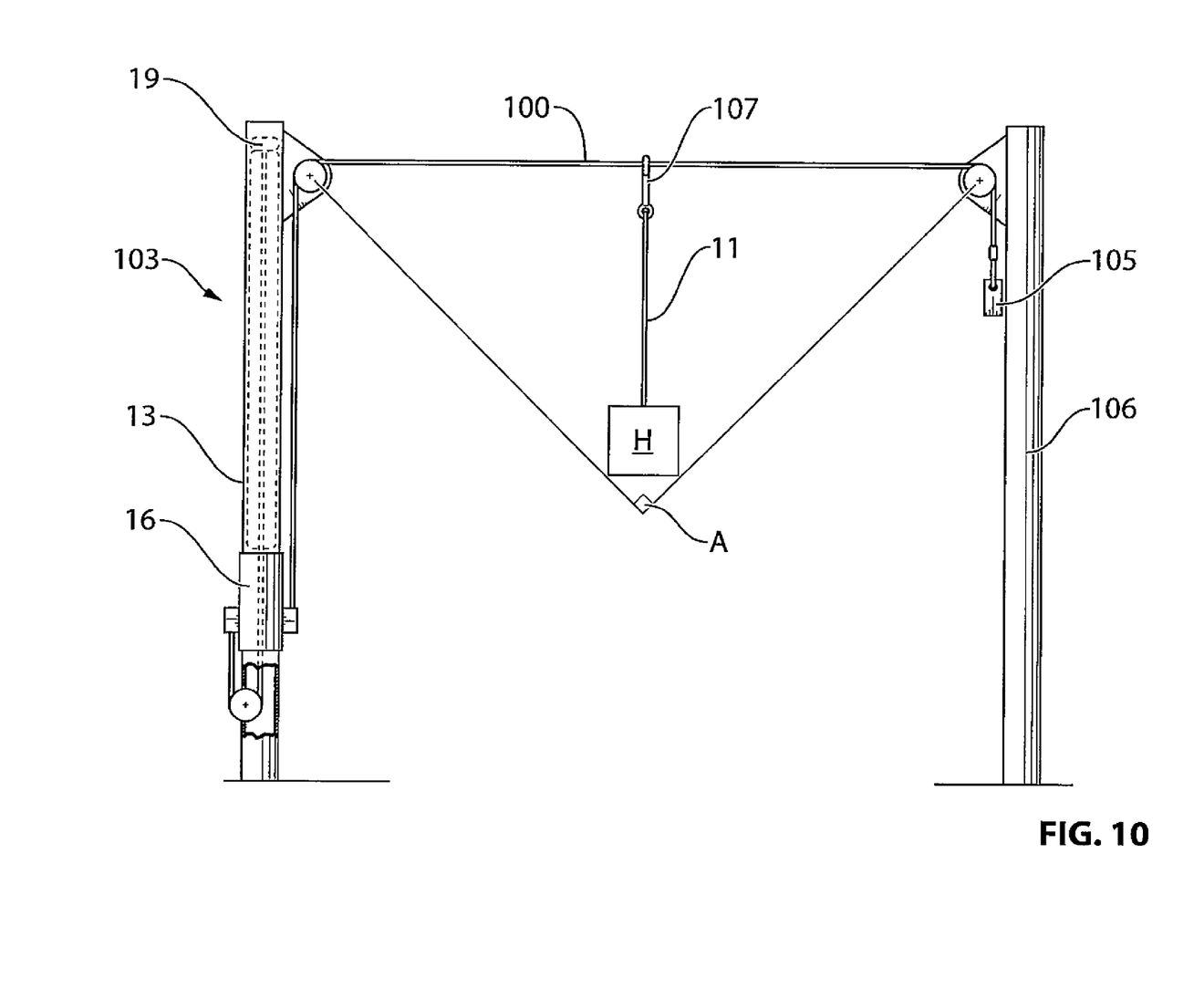
FIG. 10 is a yet further alternative configuration of the cable and shock absorbing device which allows a reduction of forces on the mounting assembly from the cable in the event of a shock or high loading.

The material the resistance member being arranged to provide substantially no resilience so that energy of the movement is absorbed rather than returned and the movable member is not returned by the resistance member from the retracted position to the initial operating position when the force is released;

Turning now to an alternative arrangement shown in FIG. 10, a shock absorber system as described above is used in an alternative construction where a cable 100 extends generally horizontally from the pulley 101 on a first support 103 to a fixed location 105 on a second support 106 for a hook 107 of at least one restraint harness assembly 11 to be attached thereto.

The cable 100 is engaged over the guide pulley 101 fixed to the support 103 and extends from the pulley 101 to an attachment 104 on the sleeve 16 of the shock absorber system. The tube 13 extends longitudinally between the sleeve 16 and the pulley 101 so that movement of the sleeve 16 along the tube 13 caused by shock forces on the cable acts to pay out the cable 100 over the pulley 101 to reduce forces on the pulley from the cable. This acts to allow the cable to sag to an angle A which dramatically decreases the horizontal loading on the pulley 101 and the fixed point 105. Where the pulley 101 is fixed to one wall of a building and the fixed point 105 is on an opposed wall, this reduction in the shock loading on these walls can allow the system to be attached to existing walls without overloading the structure of the building.

The invention claimed is:

1. A fall restraint apparatus for receiving a shock load from a cable arranges to be attached to a worker in the event that the worker falls comprising:
a mast standing upwardly from a bottom support;
a boom mounted on the mast and extending therefrom outwardly to one side of the mast;
the boom having a cable receiving member at the outer end thereof arranged for receiving the shock loads thereon from the cable;
the mast supporting the boom where the shock load applied to the receiving member is transferred to the mast and the bottom support of the mast;
and a shock absorber for absorbing at least part of the shock load applied to the cable receiving member so as to reduce the load applied to the mast and the bottom support of the mast, the shock absorber comprising:
a movable member mounted on the boom for sliding movement longitudinally along the boom from an initial operating position;
the cable receiving member being connected such that the shock load applies a force to the movable member in a direction to cause said sliding movement along the boom;
and a plastically deformable resistance member operable between the boom and the movable member to control said sliding movement of the movable member longitudinally along the boom;
the plastically deformable resistance member being arranged to hold the movable member against movement up to a predetermined maximum allowable force applied from the cable receiving member to the movable member;
the plastically deformable resistance member being arranged once the maximum allowable force is exceeded to allow said sliding movement of the movable member to a retracted position on the boom spaced from said initial operating position;
the plastically deformable resistance member being arranged to provide substantially no resilience so that energy of said shock load is absorbed rather than returned and the movable member is not returned by the plastically deformable resistance member from the retracted position to the initial operating position when said shock load is released;
the cable receiving member and the movable member being arranged, in the retracted position by said sliding movement, to reduce a distance of the cable receiving member from the mast relative to a distance of the cable receiving member from the mast in said initial operating position so as to reduce a mechanical advantage of the shock load on the mast.

2. The apparatus according to claim 1 wherein the receiving member and the movable member are arranged, in the retracted position, so that an angle of the boom relative to the mast is reduced relative to an angle of the boom relative to the mast in said initial operating position.

3. The apparatus according to claim 1 wherein the plastically deformable resistance member comprises a friction brake.

4. The apparatus according to claim 1 wherein the plastically deformable resistance member comprises a compressible material which is compressed by the shock load.

5. The apparatus according to claim 4 wherein the compressible member compresses longitudinally of a direction of said sliding movement.

6. The apparatus according to claim 1 wherein the boom comprises a tube which contains said plastically deformable resistance member in an interior thereof.

7. The apparatus according to claim 6 wherein there is provided a flexible connecting member connected between the plastically deformable resistance member in the interior of the tube and the movable member and wherein the flexible connecting member extends longitudinally along the tube and is guided over a pulley at one end so as to allow the movable member to slide along the tube away from the said one end of the tube.

8. The apparatus according to claim 6 wherein the movable member is a sleeve surrounding the tube.

9. A fall restraint apparatus for receiving a shock load from a cable arranged to be attached to a worker in the event that the worker falls comprising:
- a mast standing upwardly from a bottom support;
- a boom mounted on the mast and extending therefrom outwardly to one side of the mast;
- a winch for releasing and withdrawing a cable;
- the boom having a pulley at the outer end thereof over which the cable passes so that the shock load from the cable is applied to the pulley and thus to the boom;
- the mast supporting the boom so that the shock load applied to the pulley is transferred to the mast and the bottom support of the mast;
- and a shock absorber for absorbing at least part of the shock load applied to the cable receiving member so as to reduce the load applied to the mast and the bottom support of the mast, the shock absorber comprising:
- a movable member carrying the pulley mounted on the boom for sliding movement longitudinally along the boom from an initial operating position;
- the cable receiving member being connected such that the shock load applies a force to the movable member in a direction to cause said sliding movement longitudinally along the boom;
- and a plastically deformable resistance member operable between the boom and the movable member to control said sliding movement of the movable member longitudinally along the boom;
- the plastically deformable resistance member being arranged to hold the movable member against movement up to a predetermined maximum allowable force applied from the cable receiving member to the movable member;
- the plastically deformable resistance member being arranged once the maximum allowable force is exceeded to allow said sliding movement of the movable member to a retracted position on the boom spaced from said initial operating position;
- the plastically deformable resistance member being arranged to provide substantially no resilience so that energy of said shock load is absorbed rather than returned and the movable member is not returned by the plastically deformable resistance member from the retracted position to the initial operating position when said shock load is released;
- the cable receiving member and the movable member being arranged, in the retracted position by said sliding movement, to reduce a distance of the cable receiving member from the mast relative to a distance of the cable receiving member from the mast in said initial operating position so as to reduce a mechanical advantage of the shock load on the mast.

10. The apparatus according to claim 9 wherein the receiving member and the movable member are arranged, in the retracted position, so that an angle of the boom relative to the mast is reduced relative to an angle of the boom relative to the mast in said initial operating position.

11. The apparatus according to claim 9 wherein the plastically deformable resistance member comprises a friction brake.

12. The apparatus according to claim 9 wherein the plastically deformable resistance member comprises a compressible material which is compressed by the shock load.

13. The apparatus according to claim 12 wherein the compressible member compresses longitudinally of a direction of said sliding movement.

14. A fall restraint apparatus for receiving a shock load from a cable arranged to be attached to a worker in the event that the worker falls comprising:
- a mast standing upwardly from a bottom support;
- a boom mounted on the mast and extending therefrom outwardly to one side of the mast, the boom forming a generally tubular member;
- a winch for releasing and withdrawing a cable;
- the boom having a pulley at the outer end thereof over which the cable passes so that the shock load from the cable is applied to the pulley and thus to the boom;
- the mast supporting the boom so that the shock load applied to the pulley is transferred to the mast and the bottom support of the mast;
- and a shock absorber for absorbing at least part of the shock load applied to the cable receiving member so as to reduce the load applied to the mast and the bottom support of the mast, the shock absorber comprising:
- a movable member carrying the pulley mounted on the boom for sliding movement longitudinally along the boom from an initial operating position, the movable member forming a collar generally surrounding the tubular member;
- the cable receiving member being connected such that the shock load applies a force to the movable member in a direction to cause said sliding movement longitudinally along the boom;
- and a plastically deformable resistance member operable between the boom and the movable member to control said sliding movement of the movable member longitudinally along the boom;
- the plastically deformable resistance member being located inside the tubular member forming the boom;
- the plastically deformable resistance member being arranged to hold the movable member against movement up to a predetermined maximum allowable force applied from the cable receiving member to the movable member;
- the plastically deformable resistance member being arranged once the maximum allowable force is exceeded to allow said sliding movement of the movable member to a retracted position on the boom spaced from said initial operating position;
- the plastically deformable resistance member being arranged to provide substantially no resilience so that energy of said shock load is absorbed rather than returned and the movable member is not returned by the plastically deformable resistance member from the retracted position to the initial operating position when said shock load is released;
- the cable receiving member and the movable member being arranged, in the retracted position by said sliding movement, to reduce a distance of the cable receiving member from the mast relative to a distance of the cable receiving member from the mast in said initial operating position so as to reduce a mechanical advantage of the shock load on the mast.

15. The apparatus according to claim 14 wherein the plastically deformable resistance member comprises a friction brake.

16. The apparatus according to claim 14 wherein the plastically deformable resistance member comprises a compressible material which is compressed by the shock load.

17. The apparatus according to claim 16 wherein the compressible member compresses longitudinally of a direction of said sliding movement.

* * * * *